Feb. 6, 1951 P. E. GELDHOF ET AL 2,540,723
AUTOMATIC WASHING APPLIANCE AND CONTROL SYSTEM THEREFOR
Filed Oct. 14, 1944 3 Sheets-Sheet 1

Inventors
PETER EDUARD GELDHOF.
LUTHER RINGER.

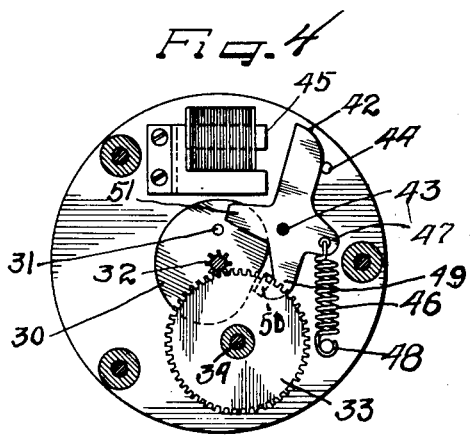
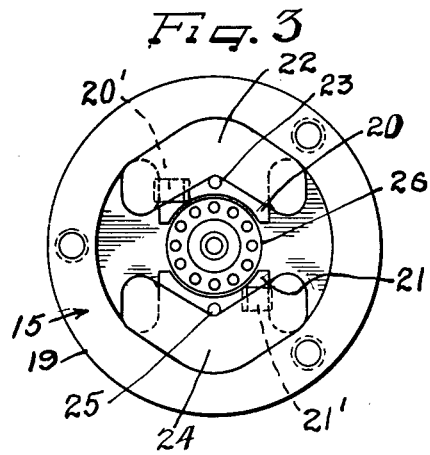
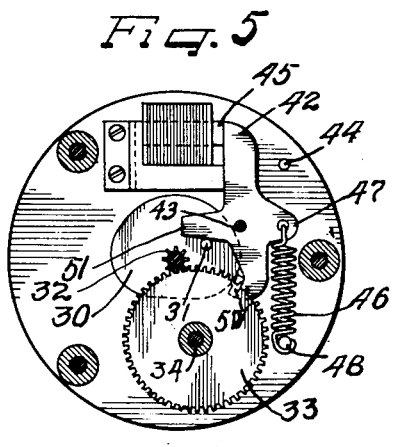
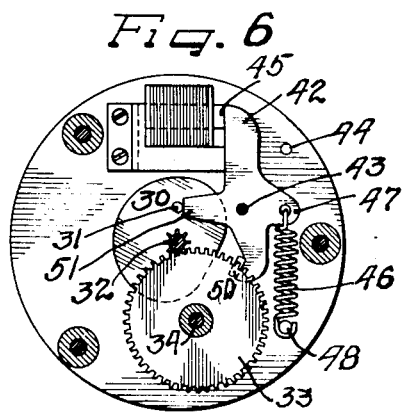
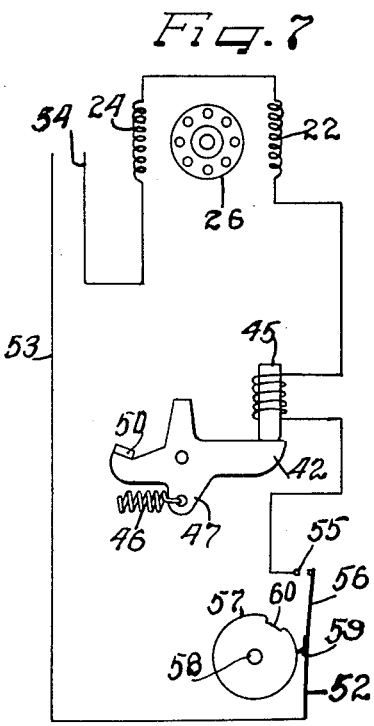
Inventors
PETER EDUARD GELDHOF.
LUTHER RINGER.

Feb. 6, 1951 P. E. GELDHOF ET AL 2,540,723
AUTOMATIC WASHING APPLIANCE AND CONTROL SYSTEM THEREFOR
Filed Oct. 14, 1944 3 Sheets-Sheet 3
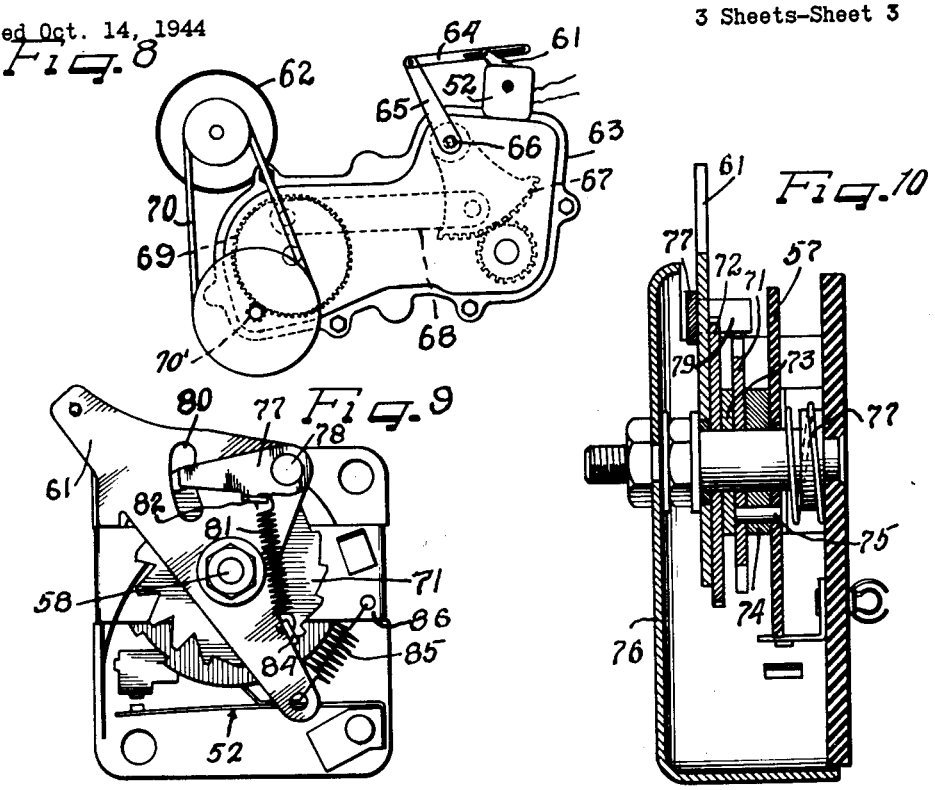
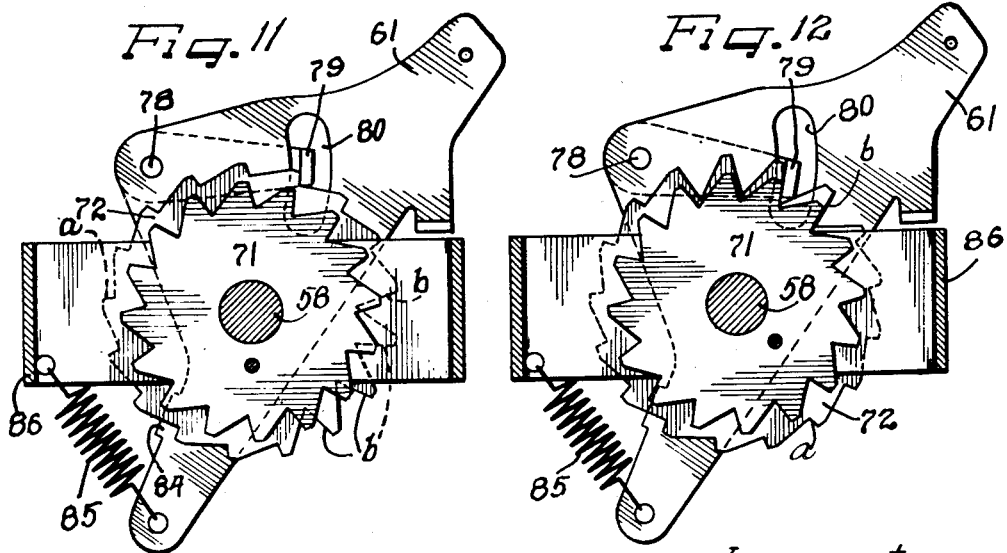
Inventors
PETER EDUARD GELDHOF.
LUTHER RINGER.

Patented Feb. 6, 1951

2,540,723

UNITED STATES PATENT OFFICE

2,540,723

AUTOMATIC WASHING APPLIANCE AND CONTROL SYSTEM THEREFOR

Peter Eduard Geldhof and Luther Ringer, St. Joseph, Mich., assignors to Nineteen Hundred Corporation, St. Joseph, Mich., a corporation of New York Application October 14, 1944, Serial No. 558,712

4 Claims. (Cl. 161—1)

Our invention relates to an automatic washing appliance and to a control system and time switch therefor.

Heretofore, washing appliances have been manufactured with a control system including a time switch for automatically controlling the period of the washing, rinsing, and drying cycles of the appliance. Since the various operations of the washer appliance may each last for several minutes, the various control switches connected in the control circuits of the washing, rinsing and drying circuit may be opened or closed also for several minutes. Therefore, if a relatively slow-moving time switch is employed in which the contacts are slowly opened or closed, considerable arcing may be caused at the contacts. It has therefore been customary in the application of time switches in the automatic washing machine field to employ a construction in which the switch control contacts are opened and closed relatively rapidly in order to minimize arcing at the contacts.

Time switches which have been employed in the past may be broadly classified into two groups; namely, those in which the cams for opening and closing the switch element have a continuous rotary movement derived from a continuously rotating driving member, and those in which the cams have an intermittent rotary motion derived from an intermittent or continuously rotating driving member. It is this latter type of time switches in which the cams have an intermittent rotary motion which have found application in the automatic washing machine art, as the contacts may be opened and closed relatively rapidly without undue arcing even though substantial amounts of current may be broken.

One customary manner of obtaining an intermittent drive on the driven cam shaft from a continuously rotating drive member, which may be rotated for example by a small clock motor, is to couple the driving and driven member with a spring arrangement. One end of the spring which is attached to the driving member may be continuously rotated while the opposite end which is attached to some latch mechanism is periodically interrupted from rotating and during one period the spring may be wound up and when the latch is disengaged the spring will relatively rapidly cause the driven member to rotate until the latch is again stopped after which the same operation will be repeated.

It is, of course, possible that the energy storing device or spring in the intermittent drive timers may become fractured during operation and due to such a possibility, some timers of this type are so made that in the event of fracture of the spring a positive drive will be effected between the driving and driven member, such latter drive of course being relatively slow instead of being relatively rapid as is effected through the spring coupling. It is, therefore, one object of our invention to provide a control system for an appliance such as an automatic washer in which suitable intermittent driving of the cam shaft of a time switch may be effected without the use of the periodic loading and unloading of a spring member.

It is another object of our invention to provide an improved control system for an appliance of the automatically operable type, in which the intermittent drive for the time switch is periodically energized in response to some continuous movement of the appliance.

It is a further object of our invention to provide an improved automatic control circuit for a washing, rinsing and drying appliance.

It is a still further object of our invention to provide a novel and improved control timing circuit.

It is a still further object of our invention to provide an improved time switch arrangement suitable for use in controlling the operation of an automatically operated appliance.

Further objects and advantages of our invention will become apparent from the following description referring to the accompanying drawing, and the features of novelty which characterize our invention will be pointed out with particularity in the claims annexed to and forming a part of this specification.

In the drawings:

Figure 3 is an end view of the electric motor forming a part of the structure of Figure 1 taken along the line III—III of Figure 1;

Figure 4 is a sectional view through the time switch taken along the line IV—IV of Figure 1, and shows the intermittent drive mechanism in its de-energized position;

Figure 5 is a view similar to Figure 4 showing the initial stage of operation of the intermittent drive construction;

Figure 6 is a view similar to Figure 4 showing the cam of the intermittent drive construction after it has made one complete revolution and showing the stop mechanism on the latch in its position to interrupt movement of the drive member and electric motor;

Figure 7 is a view somewhat diagrammatically illustrating our improved timer control circuit;

Figure 8 is a bottom view of the electric motor and transmission of a washer appliance having attached thereto a timer control switch which is employed in our improved timer circuit;

Figure 9 is an elevational view of the pawl and latch construction for operating the time control switch;

Figure 10 is a sectional side elevation of the pawl and latch and switch construction of Figure 9; and Figures 11 and 12 illustrate the pawl and latch construction of Figures 9 and 10 during two periods of operation thereof.

Figure 1:
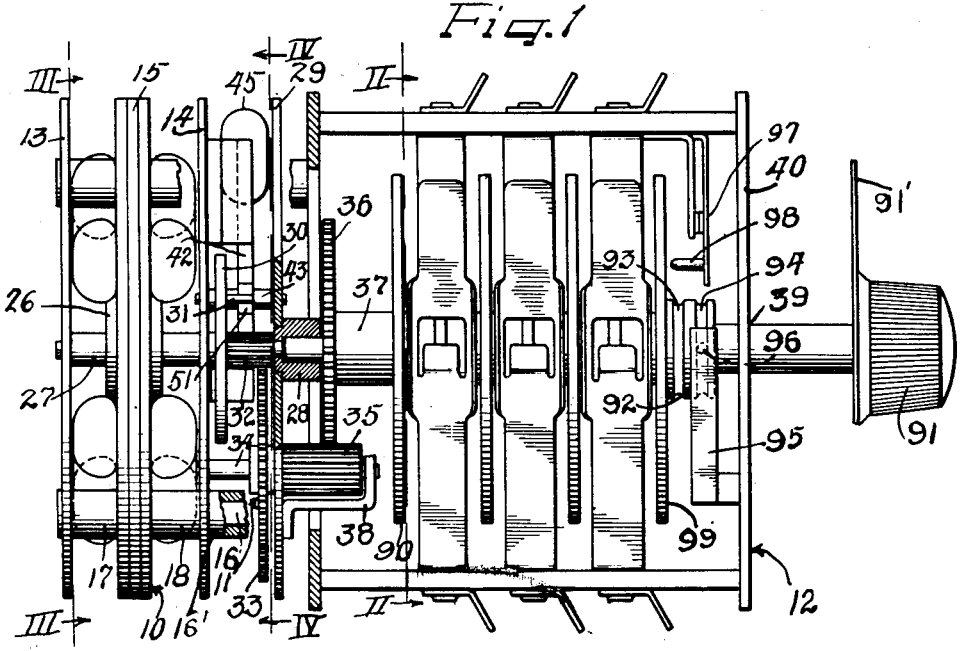
Figure 1 is an elevational view of a time switch which is employed in our present invention.
Figure 2:
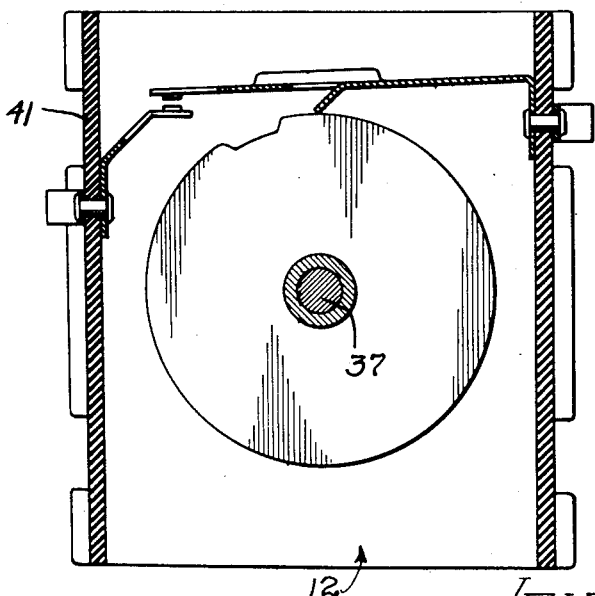
Figure 2 is an end view of one of the cams and control switches of the timer switch of Figure 1, taken along the line II—II of Figure 1.

Referring to the various figures in the drawings, the time switch construction which is employed in our improved control circuit includes a shaded pole squirrel cage induction motor 10, an intermittent coupling mechanism 11 and a cam operated switch unit 12. These structures 10, 11 and 12 are mounted together in a single integral unit as is clearly shown in Figure 1 of the drawings.

In order to rotate the cam shaft of the switch 12 through the intermittent drive mechanism 11, the motor 10 is provided which is mounted between two end plates 13 and 14 with stator laminations 15 supported on suitable pins 16, which laminations are spaced between the end plates 13 and 14 by spacers 17 and 18. The stator laminations 15 are in the form of an annular ring portion 19 with two salient pole portions 20 and 21, as will be seen more particularly in Figure 3, having shading coils 20' and 21', respectively. A field coil 22 is mounted on the salient pole portion 20 and is held in place by means of pin 23 which extends through the pole portion 20 and projects outwardly therefrom on either side. A similar field coil 24 is mounted on the pole portion 21 and is held in place by a pin 25.

The motor 10 is provided with a rotor 26 of conventional squirrel cage design, and this rotor 26 is rigidly mounted on a rotor shaft 27 which is journalled in the end plates 13 and 14.

The rotor shaft 27 extends through the end plate 14 and is supported and journalled in one end of a bearing 28. A mounting plate 29 is supported in spaced relation of the end plate 14 by pin 16 and spacer 16'.

In order that the cam switch mechanism 12 through which the various sequences of operation of the appliance are controlled, may be intermittently operated upon rotation of the motor 10, the coupling mechanism 11 is provided which may be best seen from an inspection of Figures 1 and 4 to 6 of the drawings. That portion of our control circuit which initiates operation of the motor 10 will be described hereinafter. As shown, the rotor shaft 27 has a cam 30 rigidly mounted thereon which carries a pin 31 on one face thereof. Also formed on the rotor shaft 27 is a pinion 32 which meshes with a large gear 33 rigidly mounted on a shaft 34. The shaft 34 is journalled in the end plates 14 and 29 and extends through the latter as is clearly shown in Figure 1. The portion of the shaft 34 which extends through the end of the plate 29 is provided with a pinion 35 which meshes with a large driven gear 36 and which is carried on a cam shaft 37. The right-hand end of the shaft 34, as viewed in Figure 1, is supported and journalled in a bracket 38 carried on the end plate 29. The cam shaft 37 is journalled at one end in the bearing 28 and at its opposite end in a bearing 39 of an end wall 40 of the time switch and cam housing 41.

In order to interrupt the rotation of the motor 10 at a predetermined time, a latch finger 42 is provided which is pivotally mounted on a pin 43 carried by the end plates 14 and 29. The latch finger 42 is arranged for limited angular movement between a stop pin 44 and a core member 45 of an electro-magnet, it being normally biased against the pin 44 by a biasing spring 46 which extends between an ear 47 on the latch finger 42 and a pin 48 on the end plate 14. The latch finger 42 is also provided with a cam pin engaging finger 51. When the latch 42 is in its position as shown in Figures 5 and 6 of the drawings, the cam pin engaging finger 51 lies in the path of movement of the cam pin 31.

In order to control the initiation or starting of the electric motor 10 as well as energize the field coil of the electro-magnetic member 45, the field coils 22 and 24 and electro-magnet 45 are connected in circuit through a time control or second switch 52 which will be described in further detail in relation to the description of Figures 8 through 12 of the drawings. One side of the switch is connected to a power line 53 while the other side of the switch is connected through the field coil of the electro-magnet 45 and the motor field coils 22 and 24 in series to the other side 54 of the power line. The switch member 52 includes a stationary contact member 55 and a movable contact member 56 and a cam 57 which is rotatably mounted on a cam or stud shaft 58. The movable contact arm 56 is provided with a cam follower 59 which rides on the outer peripheral surface of the cam 57 and is arranged to drop into the notched-out portion 60 of the cam 57 to allow the movable contact arm 56 to make contact with the stationary contact 55. In order to rotate the cam in response to movement of the main power means or electric motor of the appliance, the cam shaft 58 is operated through a pawl and ratchet mechanism which is shown in Figures 9 through 12 and as will be described in detail below.

In order to intermittently operate the timer switch 52 in response to a function of the operation of the appliance, an operating arm or ratchet lever 61 may be operatively connected to the main power arrangement or electric motor 62 of the appliance. As is illustrated in Figure 8, this connection is effected by mounting the switch 52 on a housing portion 63 of the main transmission construction of the appliance. A toggle arm 64 is connected at one end to the ratchet operating lever 61 and at the opposite end to an arm 65 which is oscillated by a segment shaft 66. It will be understood that the segment shaft 66 is oscillated in a conventional manner through a segment 67 and a connecting rod connection 68 which is in turn connected to a gear 69 which is rotated by the motor 62 through a belt 70 and pinion 70'.

In order that the cam 57 of the timer control switch 52 may be operated in a stepped manner, a first or smaller ratchet wheel 71 is loosely mounted to the stud or cam shaft 58 and a second or larger ratchet wheel 72 is loosely mounted on the stud or cam shaft 58. It will be seen particularly in Figure 10 that the ratchet wheels 71 and 72 are spaced by a spacer 73 while the smaller ratchet wheel 71 and the cam 57 are spaced by a spacer 74. It will be noted that the smaller ratchet wheel 71 and the cam 57 are mounted so that one will rotate with the other through a pin connection 75. This assembly is relatively tightly pressed against a casing 76 through a spring 77.

In order that oscillation of the ratchet operating lever 61 will move the ratchet wheels 71 and 72, a pawl 77 is provided which is rotatably mounted on the ratchet operating lever 61 through a rivet 78. The pawl 77 is provided with an angularly extending operating lever 79 which extends through a slot 80 in the ratchet operating lever 61 and is sufficiently long, as will be seen in Figure 10, to become operatively engaged with the teeth on both the ratchet wheels 71 and 72. A spring 81 is provided between an ear 82 on the pawl and an ear 84 on the ratchet operating lever so as to bias the pawl 77 toward the teeth of the ratchet wheels 71 and 72. It will also be noted that a second spring 85 is provided between the ratchet operating lever and a strap 86 upon which one end of the stud shaft 58 is rigidly mounted so as to bias the ratchet operating lever in one position. Thus, in viewing Figure 8, when the ratchet operating lever 61 is pushed to the right upon oscillation of the lever 65 in that direction, the ratchet operating lever will be automatically returned to its position as shown in Figure 8 through the spring 85 when the arm 65 is again oscillated to the left.

In order to rotate the smaller ratchet wheel 71 which is mounted on the cam shaft 58 in a stepped or intermittent manner, the teeth on the first ratchet wheel or larger wheel 72 have a major group which have a certain depth marked $a$ and another or fewer group which have a larger depth marked $b$. It will be seen from an inspection of Figure 11 that when the operating ear 79 of the pawl is in engagement with any of the teeth which have the shorter depth marked $a$, the pawl 79 will be held out of engagement of any of the teeth on the smaller wheel 71. During this portion of the operation of the pawl and ratchet only the wheel 72 will be rotated upon oscillation of the ratchet operating lever 61. However, when the first tooth marked $b$ comes under the ratchet operating pawl 79 in view of the increased depth, the operating ear 79 will drop into engagement with the teeth on both the ratchet wheels 71 and 72. Movement of the operator lever 61 when the pawl operating ear 79 is in engagement with the teeth identified as $b$ of the wheel 72 will cause movement of the wheel 71 which will in turn move the cam 57. Such a condition of operation is illustrated in Figure 12. Thus, as the ratchet operating lever, as is illustrated in Figures 11 and 12, oscillates from right to left it will rotate both of the wheels in a counter-clockwise direction when looking at Figure 12 during that time when the ear 79 is in engagement with the teeth marked $b$. However, as the last tooth marked $b$ rotates out of engagement with the pawl 79 continued oscillation of the operating lever 61 will again move only the larger wheel 72.

It will be understood that by merely controlling the ratio of the number of teeth with the larger depth marked $b$ with those of the shorter depth marked $a$, that the amount of rotation of the small wheel 71 for one complete rotation of the large wheel 72 may be controlled. In the construction illustrated in the drawings it will be seen that with about four teeth out of seventeen on the large wheel 72 having the larger depth $b$, the smaller ratchet wheel 71 will rotate about a quarter of a revolution for every complete revolution of the larger wheel 72. This provides a very convenient and simple arrangement for controlling the interval of time in which the timer motor 10 will be energized in relation to the time of a cycle of operation of the appliance.

Operation of our improved control system will now be described: Let us assume that the housewife has closed the main switch (not shown) so as to energize the motor 62 which is the main power means for the washing machine. Let us assume that this also energizes the lines 53 and 54 of the control circuit of Figure 7. This will cause the segment shaft 66 to oscillate which will cause the ratchet operating lever 61 to also oscillate. If the cam wheel 57 is in a position as is illustrated in Figure 7, neither the motor nor the coil 45 of the electro-magnet will be energized. Thus, the timer as shown in Figure 1 has not begun to rotate. When the timer motor is de-energized the intermittent coupling mechanism will be in the position as is illustrated in Figure 4. As the cam 57 continues to rotate the notched-out portion 60 on the peripheral surface of the cam 57, passes under the riding member 59 in the movable contact arm 56 (which is normally biased to its closed position) snaps into engagement with the stationary contact 55. It will be understood that the rider arm 59 is maintained in the cut-out portion 60 during that portion of the time when the small wheel 71 is rotating and there are a sufficient number of large teeth on the large wheel that when the small wheel 71 stops rotating the cam rider 59 will move out of the cut-out portion 60 and thus again open the circuit. It is to be understood, however, that any other suitable period of operation may be employed if desired. The closing of the contacts 55 and 56 energizes the squirrel cage induction motor 10 as well as the electro-magnet 45. Due to the fact that the latch finger 42 is a considerable distance away from the core member of the electro-magnet 45, as well as being biased by the springs 46 in a direction away from this core member of the electro-magnet, energization of the electro-magnet will not rock the latch finger in a counter-clockwise direction. The motor, however, being energized, effects movement of the rotor 26 which in turn rotates the cam 30 in a clockwise direction. Since the small pinion 32 is also rigidly secured on the rotor shaft 27 along with the cam 30, the large gear 33 is rotated, which in turn drives the large gear 36 through the pinion 35. Rotational movement of the large gear 36 turns the cam shaft 37 of the switch unit 12. It will be observed that there is a very substantial gear reduction between the gear 32 and the gear 35 and it will therefore be understood that one complete revolution of the gear 32 will only cause a very small angular movement of the cam shaft 37. This movement of the cam shaft 37, however, will take place very rapidly due to the high speed of rotation of the motor 10.

Referring again to Figures 4 through 7 of the drawings, the rotational movement of the cam shaft 27 in a clockwise direction causes the cam 30 to bear against the lip 50 of the tail portion 49 on the latch finger 42. This causes the latch finger to be rocked in a counter-clockwise direction about its pivot pin 43. This rocking movement moves the upper end of the latch finger 42 to engagement with the core of the electromagnet 45 where it is retained thereby. The position of the respective elements of the intermittent drive mechanism 11 as the cam 30 moves the latch finger 42 into engagement with the core member of the electro-magnet 45, is shown in Figure 5 of the drawings. Continued rotation of the cam 30 carries the pin 31 around until it arrives to the position to engage the finger 51 of the latch 42. By proportioning the force by which the magnet 45 holds the finger 42 towards it and that force by which the pin 31 strikes the finger 51, the motor may be made to immediately stop by the pin 31 abutting against the finger 51, such position being illustrated in Figure 6. This interrupts the rotational movement of the rotor 26 and hence, also interrupts the rotational movement of the cam shaft 37 of the switch unit 12. If for any reason, the rotating mass, including the cam 30 and the rotor 26, should bounce back slightly when the pin 31 strikes the finger portion 51, the pin will be returned to its position against the finger portion 51 due to the fact that the motor 10 is still energized.

For a further description of the intermittent drive mechanism as shown in Figures 4 through 6, reference may be had to a copending application Serial No. 558,711 to Luther Ringer, filed concurrently herewith, now Patent No. 2,444,955, dated July 13, 1948, in which application the details of this intermittent drive mechanism is claimed.

It will be understood that during this very rapid rotational movement of the cam 30 and the cam shaft 37 while the motor 10 is energized, that the cam 57 of the control switch 52 will also be moved through the pawl and ratchet mechanism as has been described above and as is illustrated in Figures 8 through 12. The notch 60 on the cam 57 is not only so cut so that the follower 59 will move into it and out of it during the time that the ear 79 cooperates with the larger teeth identified by b of the wheel 72, but the notch 60 and the rotation of the motor are so correlated that very shortly after the cam 30 has made one complete revolution the movable contact arm 56 will be forced to break contact with the stationary contact 55 which opens the circuit including the motor and electromagnet. De-energization of the electro- magnet 45 releases its hold on the latch finger 42 and the biasing spring 46 accordingly shifts the latch finger 42 back into its position against the stop pin 44. The control system including the intermittent drive mechanism is now in position, as shown in Figures 4 and 7 and the elements are thus again in a position awaiting re-energization of the motor 10 and the electro-magnet 45 after the cam 57 has made another complete revolution.

From the above description it will be apparent that the cam shaft 37 of the timer switch mechanism is intermittently advanced at periodically spaced intervals by a rapid movement. This rapid step-by-step advancement of the cam shaft 37 substantially reduces the arcing during the making and breaking of the various switch elements contained within the switch unit 12 which are open and closed by the various cams 90 which are mounted on the cam shaft 37. The extent of each angular advancement of the cam shaft 37, of course, depends upon the extent of the gear reduction through the gears 32, 33, 35 and 36, while the duration of the intervals between the angular advancements of the cam shaft 37 will, of course, depend upon the speed of rotation of the main motor 62 of the appliance, as well as the design of the pawl and ratchet mechanism of the timer control switch 52.

The details of construction of the switch unit 12 form no part of the present invention other than its general relationship to the combination, and for that reason it has not been illustrated in detail. Briefly, the switch 12 includes the cam shaft 37 which is mounted for rotation in bearings 28 and 39, as well as for a limited longitudinal movement. The cam shaft 37 carries a control knob 91 on the outer ends which is rigidly secured thereto. The control knob 91 is provided with a pointer 91' which lies opposite the dial carried on the end wall 40 of the housing of the timer switch 12. A hub 92 has two annular grooves 93 and 94 therein and is carried on the cam shaft 37 and secured thereto. A spring finger 95 mounted on the housing has a pin 96 carried on the free end thereof which is arranged to normally set within either of the grooves 93 or 94. This finger 95 is for the purpose of manually holding the cam shaft 37 in either one or two longitudinal positions.

In the position as shown, the pin 96 on the finger 95 is in engagement with the groove 94 since the cam shaft is in its normally inward position as shown in Figure 1 of the drawings. If it is desired to manually advance the position of the cam shaft 37 the knob 91 may be pulled "outwardly" until the finger 96 lies in the groove 93. In order to insure that the control circuit will be completely deenergized during any manual change, an interlock switch is provided in the main control circuit including a switch 97 which has a pin 98 carried by the movable contact thereof. The switch 97 is normally closed but if the knob 91 is pulled outwardly a cam 99 will push against the pin 98 opening the circuit. The gear 36, however, remains in mesh with the pinion 35 irrespective of the longitudinal position of the cam shaft 37.

From the above description it will be seen that we have provided a control system for intermittently advancing a timer switch at periodic intervals by initiating the movement of the timer shaft periodically in response to movement of the main power means of the washing machine such as through the segment shaft, and also setting up a circuit including electro-magnetic means through which the timer operation is interrupted abruptly after it is moved forward in predetermined amount.

Although we have shown and described a particular embodiment of our invention, we do not desire to be limited to the particular embodiment described, since many modifications may be made, and we intend in the appended claims to cover all modifications which do not depart from the true spirit and scope of our invention.

We claim as our invention:

1. In an automatic washer appliance, power means for operating said appliance, means including a time switch having a rotatable shaft for effecting a predetermined sequence of operation of said appliance, operating means for periodically operating said time switch and rotating said shaft to effect rapid closure and opening of the time switch, means including a timer control switch means for periodically initiating operation of said time switch operating means, means operative by said power means during operation of said appliance for periodically operating said control switch means, and stop means rendered effective after initiation of the operation of said switch operating means for arresting operation thereof at a predetermined interval including a pin associated with said rotating shaft, and a stop member movable into the path of said pin as said shaft rotates and an electro-magnet for holding said pin in said path to stop rotation of said shaft.

2. In a control system for an appliance, a control shaft having a plurality of actuating members for starting and stopping various operations of said appliance, an electric motor for driving said control shaft, power means for operating said appliance, cam means driven by said power means for regulating the time said electric motor is energized, and electromechanical stop means energized by said cam means for stopping the rotation of said control shaft after said motor has rotated a predetermined amount said cam means being further effective to deenergize said stop means after said control shaft is stopped.

3. In a control system for an appliance, a control shaft having a plurality of actuating members for starting and stopping various operations of said appliance, a drive shaft operatively connected for intermittently driving said control shaft, a rotatable member on said drive shaft, an electric motor for rotating said drive shaft, a cam driven from said power means for intermittently energizing and deenergizing said motor, stop means rendered operative upon partial rotation of said rotatable member for stopping the rotational movement of said rotatable member upon a predetermined further rotational movement thereof, electro-magnetic means for locking said stop means in position, and means for deenergizing said electro-magnetic means after said rotatable member has been stopped and a spring mechanism for rendering said stop means inoperative when said motor is deenergized.

4. In an automatic washer appliance, a segment shaft for effecting oscillation for a part of said appliance, power means for operating said segment shaft, time switch means for controlling the sequence of operation of said appliance, an electric motor in driving connection with said time switch, a second switch controlling the energization and deenergization of said electric motor, a rotatable cam shaft driven by said power means, a cam disk mounted for rotation thereon and arranged to operate said second switch, the first ratchet having means around its outer periphery and mounted to drive said cam, a second ratchet adjacent said first ratchet and having means around its outer periphery and mounted for rotation on said cam shaft, a ratchet operating lever movable by said segment shaft having an ear adapted to engage the teeth of said second ratchet to cause rotation thereof upon movement of said ratchet operating lever, said teeth on said second ratchet having a first group of one depth and a second group of another depth so that when said ear on said pawl engages said first group of teeth said ear will be held out of engagement with said ratchet means, said ear engaging said first ratchet means to simultaneously rotate both said first and second ratchet and said cam when said ear engages said second group of teeth on said second ratchet so that said first ratchet is rotated for a portion of the time that said second ratchet is rotated.

PETER EDUARD GELDHOF.
LUTHER RINGER.

REFERENCES CITED

The following references are of record in the file of this patent:

UNITED STATES PATENTS

| Number | Name | Date |
|---|---|---|
| 1,973,603 | Brandenburger | Sept. 11, 1934 |
| 2,000,367 | Williamson et al. | May 7, 1935 |
| 2,155,254 | Clark | Apr. 18, 1939 |
| 2,254,795 | Daniels | Sept. 2, 1941 |
| 2,290,626 | Bosomworth | July 21, 1942 |